(12) United States Patent
Hoffmeister et al.

(10) Patent No.: US 6,421,495 B1
(45) Date of Patent: Jul. 16, 2002

(54) TERMINAL DEVICE FOR AN END OF A FIBER-OPTIC CABLE

(75) Inventors: Hendryk Hoffmeister, Berlin; Hans-Dieter Weigel, Caputh, both of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/495,966

(22) Filed: Feb. 2, 2000

(30) Foreign Application Priority Data

Feb. 2, 1999 (DE) .......................... 199 05 246

(51) Int. Cl.[7] ................................. G02B 6/36
(52) U.S. Cl. .................. 385/139; 385/71; 385/59; 385/86
(58) Field of Search .................... 385/114, 55, 56, 385/57, 58, 59, 69, 70, 71, 73, 76, 77, 86, 87

(56) References Cited

U.S. PATENT DOCUMENTS 4,047,797 A * 9/1977 Arnold et al.
5,048,915 A * 9/1991 Coutts et al.

* cited by examiner

*Primary Examiner*—Hung N. Ngo
(74) *Attorney, Agent, or Firm*—Laurence A. Greenberg; Werner H. Stemer; Gregory L. Mayback

(57) ABSTRACT

The fiber-optic cable is provided with a cable jacket from which at least one optical fiber and ends of a strength member emerge. To achieve reliable mechanical fixation of the strength member to a housing the strength member is bent back over an annular bend former onto the cable jacket. The ends are secured to the cable jacket rearwardly of the bend former by a retainer.

10 Claims, 1 Drawing Sheet

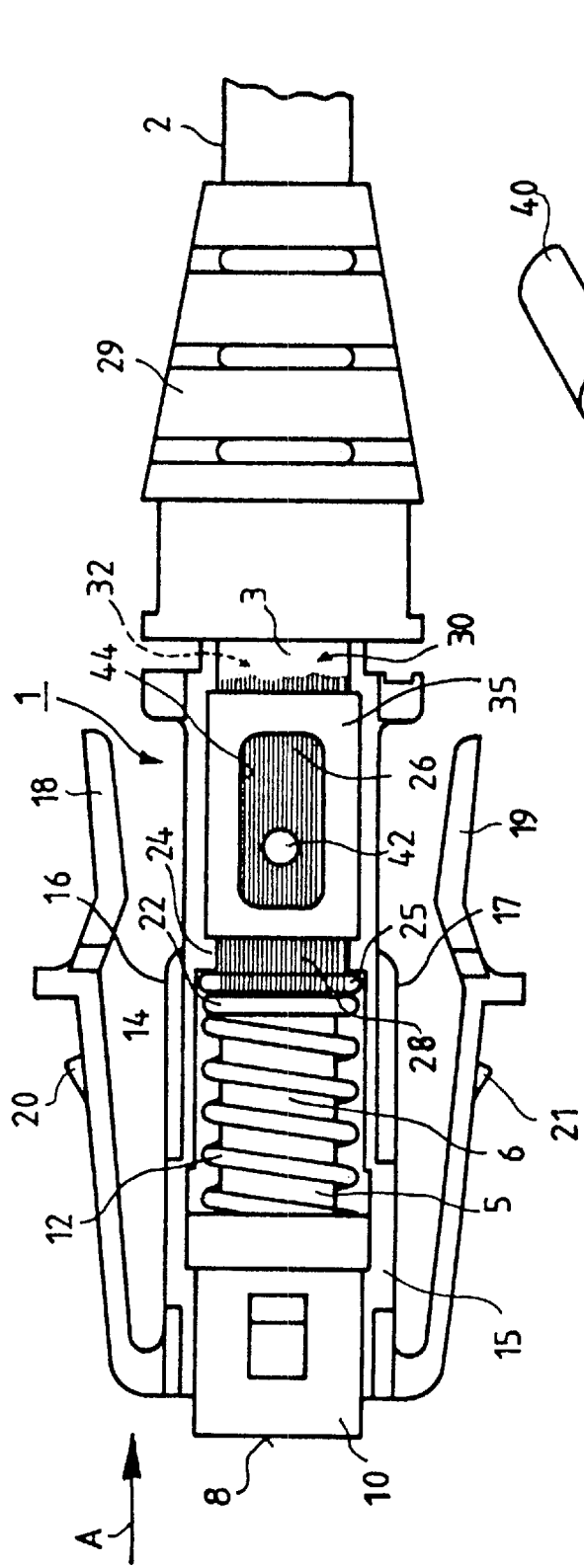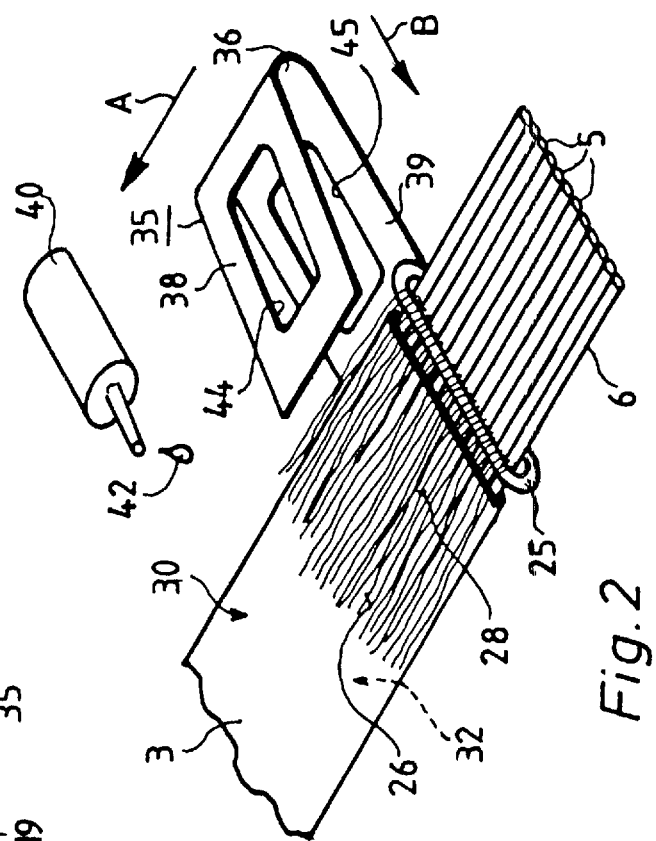

TERMINAL DEVICE FOR AN END OF A FIBER-OPTIC CABLE

BACKGROUND OF THE INVENTION

Field of the Invention

The invention lies in the field of optical data transmission over optical fibers and relates, in particular, to a termination of an optical-fiber cable equipped with a jacket and strength members, the termination having the capacity to absorb mechanical loads, especially tensile loads, which is necessary for the protection of optical fibers.

It has become known in principle from the commonly assigned German patent application 3813076 A1 that fiber-optic cable connections can be protected from external tensile loads by stripping the cable jacket from each end region of a fiber-optic cable and fixing the respective end of a strength member running in the cable jacket on a metal sleeve by crimping. In that prior art terminal configuration, a first sleeve containing through holes is inserted into the open end of the cable jacket to accommodate the sensitive optical fibers. The ends of the strength member emerging from the cable jacket are folded back and fixed mechanically between the inserted sleeve and a further crimped sleeve that is pushed externally over the end of the cable jacket. In this way the peripheral portions of the end of the cable jacket function as edges over which the strength member is folded back. Since the cable jacket is made of a material that on the whole is flexible and compliant, well-defined folding of the strength member is not ensured. Furthermore, the compliant behavior of the cablejacket material can lead to undesired loosening of the terminal device during use of the cable under tensile loads.

U.S. Pat. No. 4,447,120 discloses a terminal device which is expensive to manufacture. In that terminal device, the strength member together with the optical fibers to be protected passes through a longitudinal hole of a first sleeve provided at both ends with terminating flanges. The ends of the strength member are guided through longitudinal slots in the forward region of the flange onto the outer jacket of the sleeve and are placed in a plurality of helical turns around the sleeve jacket. The ends of the strength member are fixed to the sleeve by a second sleeve crimped onto the first sleeve.

U.S. Pat. No. 5,574,819 (German DE 4303737 A1) discloses a terminal device for a cable end fitting in which the cablejacket end is inserted through an entry opening into an encapsulating container. A split sleeve is inserted at least partly into the cable-jacket end by prying apart the ends of the strength member. The split sleeve is dimensioned such that it stretches the cable jacket beyond the cross section of the entry opening of the encapsulating container. Encapsulating compound introduced into the container surrounds the optical fibers and the strength member, in order to fix them positively with an interlocking form lock or frictionally.

SUMMARY OF THE INVENTION

The object of the invention is to provide a terminal device for an end of a fiber-optic cable, especially with oval cross section, which requires a small radial overall space and can be easily assembled —even in the field.

With the foregoing objects in view there is provided, in accordance with the invention, a fiber optic cable terminal device, comprising:

a housing body holding a fiber optic cable jacket from which at least one optical fiber and ends of a strand-like strength member with ends project in a forward direction;

a bend former about which the ends of the strength member are bent back onto the cable jacket; and a retainer disposed rearward of the bend former and fixing the ends of the strength member to the cable jacket.

In other words, the objects of the invention are satisfied by a terminal device for an end of a fiber-optic cable having a cable jacket from which at least one optical fiber and ends of a strand-like strength member emerge, the ends of the strength member being bent back around a bend former onto the cable jacket and fixed to the cable jacket by a retainer disposed rearwardly of the bend former as seen from the end.

A first substantial advantage of the invention is that high capacity to absorb tensile force is ensured by a relatively simple structural element—namely the bend former—in cooperation with the retainer disposed therebehind, especially when the folding radii are advantageously narrow. The ends of the strength member are folded back over the bend former at well-defined edges, thus creating an arrangement with long-term stability. By the disposition of the retainer rearwardly of the bend former (as seen from the cable end), there is achieved an arrangement which on the whole is extremely space-saving in radial direction. Despite the assurance of high capacity to absorb tensile forces, the arrangement according to the invention can be prepared with relatively few and simple piece parts—even during field assembly. A further advantage of the invention is that the bend former itself can be braced directly on an edge of a housing for accommodation of the terminal device, for example, so that direct force dissipation from the strength member to the housing can be achieved with small overall size.

In accordance with an added feature of the invention, the cable jacket is a flat jacket with two flat sides containing a plurality of optical fibers combined to form a ribbon. The flat, multi-channel ribbon cable application, wherein the cable jacket is a flat jacket containing a plurality of optical fibers combined to form a ribbon is a particularly preferred application.

In accordance with an additional feature of the invention, the retainer is formed to fix the ends of the strength member to the two flat sides of the cable jacket. Symmetric fixation of the strength member in a manner which is mechanically very durable can be achieved by fixing the ends of the strength member to the two broad sides of the cable jacket.

In accordance with another feature of the invention, the retainer is formed with at least one opening through which an adhesive or an encapsulating compound is applied onto the ends of the strength member. This alternative embodiment is preferred from the manufacturing viewpoint and achieves even higher tensile strength. The adhesive or encapsulating compound is applied on the underlying ends of the strength member.

In accordance with a further feature of the invention, which is applicable to the flat cable jacket with the two flat broad sides, the retainer is a clip having one clip arm on each broad side of the cable jacket, and each clip arm is formed with an opening.

From the manufacturing and assembly viewpoint, the clip should preferably have a U-shaped cross section. The clip can then be simply slipped sideways onto the end region of the cable jacket, thus trapping each end of the strength member between the respective arm of the clip and the outside of the cable jacket, after which the ends are simply clamped securely by bending the clip arms together.

Particularly favorable mechanical conditions are obtained according to a concomitant feature of the invention, in which the bend former is oval. The bend former can then preferably comprise one to two—preferably 1.5—turns of a spring wire.

Other features which are considered as characteristic for the invention are set forth in the appended claims.

Although the invention is illustrated and described herein as embodied in a terminating arrangement for an end of a fiber-optic cable it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a side view of a terminal device according to the invention; and

FIG. 2 is a perspective view showing assembly steps during the preparation of the terminal device.

DESCRIPTION OF THE PREFERRED EMBODIMENTS

Referring now to the figures of the drawing in detail and first, particularly, to FIG. 1 thereof, there is shown an already completely assembled terminal device at an end 1 of a fiber-optic cable 2. The cable comprises a cable jacket 3, in which there run one or more optical fibers 5. In the exemplary embodiment of FIG. 1 there are provided twelve optical fibers, all aligned in one plane in the form of an optical-fiber ribbon 6. The optical fibers are terminated at an end face 8 of a multi-strand optical-fiber connector 10, in the form, for example, of an MT connector. The end faces of the optical fibers have been prepared for coupling. A connector pin 10 is supported in such a way that it can slide axially in a housing 15 against the force of a compression spring 12 which is formed with oval turns 14. In the coupled condition, the spring 12 is compressed by a non-illustrated mating piece via pressure on the end face 8, thus leading to a desired snug physical contact of the face 8 of the connector pin 10 with its associated mating piece. At the two narrow sides 16, 17 of housing 15 there are respectively provided latching levers 18, 19 with snap-in noses 20, 21. The snap-in noses 20, 21 act to lock and fix the housing 15 in a non-illustrated connector socket. A bend former 25 is provided between rearward end 22 of spring 12 and housing shoulder 24. The bend former 25 can be constructed preferably as a ring or loop with oval contour, the side thereof remote from connector pin 8 being braced against a shoulder 24.

The ends of the optical fibers 5 emerging from the cable jacket 3 extend through the inside space of the spring 12 toward the connector pin 8, ends 26 of a strength member 28 (such as aramide fibers), which also emerge from the cable jacket 3, are bent back outwardly over the ring 25, and at the top rest on an upper broad side 30 (see FIG. 1) at the bottom rest on lower broad side 32 (see FIG. 2) of the cable jacket. In the rearward region of the configuration, outgoing cable 2 is surrounded by an anti-kink sheath 29. A retainer 35 holds the ends 26 of the strength member 28 and fixed them in a longitudinal direction A rearwardly of ring 25, as seen from the cable end.

Referring now more specifically the FIG. 2, the above-describe elements are assembled as follows: Cable jacket 3, optical fibers 5 emerging therefrom as ribbon 6 and strength member 28 with its ends 26 forced back onto the outside of cable jacket 3 are all discernible in FIG. 2. The strength member 28 is bent back with its ends in a relatively narrow radius over the ring 25 (bend former) to run along upper broad side 30 and lower broad side 32 of cable jacket 3. Bend former preferably comprises one or more turns of a spring wire. It is particularly advantageous when the bend former 25 comprises 1.5 spring turns, so that the ends of the spring turn overlap, but nevertheless permit simple assembly while assuring adequate strength.

With reference to the longitudinal direction A, the ends 26 of the strength member 28 are fixed rearwardly of the bend former 25 by a retainer 35, which is pushed on sideways in the direction of an arrow B, for example. The retainer 35 in the exemplary embodiment is designed as a clip. The clip 35 is first guided in spread condition over the entire arrangement in the direction of the arrow B, until a junction region 36 of its two arms 38, 39 reaches the peripheral region of the flat cable jacket 3. In this condition the arms 38, 39 are clamped together, thus immobilizing the ends 26 of the strength member between them and the respective broad side 30, 32. Thereafter, following assembly of the clip 35, a suitable quantity of adhesive or encapsulating compound 42 is applied from a dispensing device 40 through openings 44, 45 in the arms 38, 39 onto the strength member.

We claim:

1. A fiber optic cable terminal device, comprising:
   a housing body holding a fiber optic cable jacket from which at least one optical fiber and ends of a strand-like strength member with ends project in a forward direction;
   a bend former about which the ends of the strength member are bent back onto the cable jacket, said bend former being separate from the fiber optic cable jacket; and
   a retainer disposed rearward of said bend former and fixing the ends of the strength member to the cable jacket.

2. The terminal device according to claim 1, wherein the cable jacket is a flat jacket with two flat sides containing a plurality of optical fibers combined to form a ribbon.

3. The terminal device according to claim 2, wherein said retainer is formed to fix the ends of the strength member to the two flat sides of the cable jacket.

4. The terminal device according to claim 1, wherein said retainer has at least one opening formed therein through which an adhesive or an encapsulating compound is applied on the ends of the strength member.

5. The terminal device according to claim 1, wherein the cable jacket is a flat jacket with two flat broad sides and said retainer is a clip having one clip arm on each broad side of the cable jacket, and wherein each clip arm is formed with an opening.

6. The terminal device according to claim 5, wherein said clip has a U-shaped cross section.

7. The terminal device according to claim 1, wherein said bend former is oval.

8. The terminal device according to claim 1, wherein said bend former comprises between one and two turns of a spring wire.

9. The terminal device according to claim 1, wherein said bend former comprises approximately one and one half turns of a spring wire.

10. A fiber optic cable terminal device, comprising:
    a housing body holding a fiber optic cable jacket from which at least one optical fiber and ends of a strand-like strength member with ends project in a forward direction;

a bend former about which the ends of the strength member are bent back onto the cable jacket, said bend former being separate from the fiber optic cable jacket; and a retainer being separate from said housing body, said retainer disposed rearward of said bend former and fixing the ends of the strength member to the cable jacket.

* * * * *